United States Patent
Hybertson et al.

(10) Patent No.: US 11,134,304 B2
(45) Date of Patent: Sep. 28, 2021

(54) METHODS AND APPARATUS THAT FACILITATE CHANNEL SWITCHING DURING COMMERCIAL BREAKS AND/OR OTHER PROGRAM SEGMENTS

(71) Applicant: Time Warner Cable Enterprises LLC, St. Louis, MO (US)

(72) Inventors: Eric D. Hybertson, Longmont, CO (US); Dean Osborne, Thornton, CO (US); Charles Hasek, Broomfield, CO (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 1613 days.

(21) Appl. No.: 13/955,989

(22) Filed: Jul. 31, 2013

(65) Prior Publication Data

US 2015/0040176 A1 Feb. 5, 2015

(51) Int. Cl.
*H04N 21/438* (2011.01)
*H04N 21/44* (2011.01)
*H04N 21/81* (2011.01)
*H04N 21/466* (2011.01)

(52) U.S. Cl.
CPC ... *H04N 21/4383* (2013.01); *H04N 21/44008* (2013.01); *H04N 21/4667* (2013.01); *H04N 21/812* (2013.01)

(58) Field of Classification Search
CPC ............. H04N 21/4383; H04N 21/812; H04N 21/4667; H04N 21/44008; H04N 21/47217; H04N 21/2541; H04N 21/4627; H04N 21/4147; H04N 5/775

USPC ............................................... 725/22, 32, 36
See application file for complete search history.

(56) References Cited

U.S. PATENT DOCUMENTS

| | | | |
|---|---|---|---|
| 7,330,510 B2 * | 2/2008 | Castillo | H04N 19/61 375/240.25 |
| 7,487,523 B1 * | 2/2009 | Hendricks | 725/34 |
| 7,610,606 B2 * | 10/2009 | Carlucci | G06F 3/0482 725/95 |
| 8,249,497 B2 | 8/2012 | Ingrassia et al. | |
| 2001/0014974 A1 * | 8/2001 | Asada | H04N 5/445 725/88 |
| 2002/0087979 A1 * | 7/2002 | Dudkiewicz | H04N 7/163 725/34 |

(Continued)

*Primary Examiner* — William J Kim
(74) *Attorney, Agent, or Firm* — Straub & Straub; Michael P. Straub; Stephen T. Straub (57) ABSTRACT

Methods and apparatus that facilitate watching of programming content on a secondary channel during a program segment, e.g., commercial break or program portion which is not of interest to a user, on a primary channel are described. In various embodiments when a user switches to a secondary channel during a program segment, the switch is detected and the program on the primary channel continues to be received and buffered while the content from the secondary channel is output to the display. The program segment on the primary channel may be a commercial break including one or more commercials or a portion of a program identified as a segment in information communicated with the program or via out of band signaling. The end of the segment on the primary channel is detected and the user is notified or automatically switched back to the primary channel at the end of the segment.

17 Claims, 5 Drawing Sheets

(56) References Cited

U.S. PATENT DOCUMENTS

| | | | | |
|---|---|---|---|---|
| 2002/0120925 A1* | 8/2002 | Logan | A23L 2/52 | 725/9 |
| 2002/0194595 A1* | 12/2002 | Miller et al. | | 725/36 |
| 2004/0177384 A1* | 9/2004 | Kahn | H04N 5/50 | 725/140 |
| 2005/0262539 A1* | 11/2005 | Barton | G11B 27/034 | 725/90 |
| 2007/0030966 A1* | 2/2007 | Sra | H04N 7/0887 | 380/201 |
| 2007/0143820 A1* | 6/2007 | Pawlowski | G11B 27/034 | 725/145 |
| 2007/0157235 A1* | 7/2007 | Teunissen | H04N 5/50 | 725/38 |
| 2008/0022347 A1* | 1/2008 | Cohen | H04N 7/17336 | 725/134 |
| 2008/0126919 A1* | 5/2008 | Uskali | G11B 27/105 | 715/200 |
| 2009/0025027 A1* | 1/2009 | Craner | H04H 20/103 | 725/32 |
| 2009/0086970 A1* | 4/2009 | Kahn | H04L 63/0464 | 380/211 |
| 2010/0125888 A1* | 5/2010 | Jerram | H04L 12/2834 | 725/116 |
| 2010/0251318 A1* | 9/2010 | Simoes Rodrigues | H04N 1/00214 | 725/114 |
| 2010/0293059 A1* | 11/2010 | Davison | G06Q 30/02 | 705/14.69 |
| 2010/0306401 A1* | 12/2010 | Gilson | H04N 5/765 | 709/231 |
| 2011/0109801 A1* | 5/2011 | Thomas | H04N 5/44 | 348/565 |
| 2011/0191801 A1* | 8/2011 | Vytheeswaran | H04N 7/10 | 725/34 |
| 2011/0311204 A1* | 12/2011 | Adimatyam | H04N 5/44543 | 386/295 |
| 2012/0185899 A1 | 7/2012 | Riedl et al. | | |
| 2013/0309986 A1* | 11/2013 | Cox | H04N 5/775 | 455/179.1 |

* cited by examiner

METHODS AND APPARATUS THAT FACILITATE CHANNEL SWITCHING DURING COMMERCIAL BREAKS AND/OR OTHER PROGRAM SEGMENTS

FIELD OF THE INVENTION

The present invention relates to content playback methods and apparatus and, more particularly, to methods and apparatus that facilitate watching of programming content on a secondary channel during a program segment, e.g., commercial break or program portion which is not of interest to a user, on a primary channel.

BACKGROUND OF THE INVENTION

It is not uncommon for a user watching live television or other content which is being streamed in a linear manner to be confronted with commercial advertisements while watching content such as movies, music videos, live programming content etc. The user entity streaming or otherwise providing the content may require the content to be streamed in a linear fashion at or near the rate at which it is to be viewed either because of physical constraints such as the fact that the content is being generated in real time such as in the case of sporting events or for business reasons, e.g., to try and make a viewer view commercials being provided with the content.

A user normally has few options with regard to commercial breaks when attempting to watch linear programming. While a user may switch channels during the period of time a commercial break is provided to the user's playback device the user may not know when the commercial break is over and may miss a portion of the content being presented.

Some users who do not care to watch such commercial advertisements while watching their desired content such as movies, TV shows, live sports event, on a given channel browse through the program guide and/or surf around switching to various different channels waiting for the commercial to end. Currently the only way to find out whether a commercial break has ended and the desired content has resumed is to switch back to the channel that the user was watching prior to switching. In many cases the length of commercial breaks is not constant and may vary and therefore a user may have to tune to the original channel multiple times to check if the commercial break has ended. Thus even if a user switches to a different program channel it is generally annoying for the user to switch back again and again to check if the commercial break has ended and the desired programming has resumed.

While recording content and playing it back at a later time may provide a viewer an opportunity to manually skip recorded commercials, this is not an option when the viewer wants to view the content in real time which is often the case with sporting events and other events which are transmitted in real time while the event is ongoing. Furthermore, at least some content providers may restrict the recording of content allowing for buffing of portions of a program but preclude recording of an entire program. Hardware constraints and limited memory in streaming devices may also make recording, e.g., storing, of an entire program in memory impossible. Thus constraints on the recording of content may make it difficult, if not impossible to record a full program and then view it at a later time with while manually skipping commercials.

While various attempts have been made to facilitate commercial skipping, such attempts normally relate to skipping commercials in previously recorded content and do not address the problem of commercial skipping while content is being provided in a linear fashion, e.g., during an ongoing presentation, broadcast or during a period of time in which content including the commercial breaks is being streamed in a linear fashion.

In view of the above discussion, it should be appreciated that there is a need for developing methods and/or apparatus which would allow a user to be switch from a channel providing content in a linear fashion to watching other content, e.g., on another channel, without concern for missing portions of the program on the primary channel.

SUMMARY OF THE INVENTION

Methods and apparatus which allow a user to switch to a different channel during periods of time during which a program portion which is not of interest to a user, e.g., a program segment which is not of interest or during which one or more advertisements are presented on a first channel are described. For purposes of discussion the first channel on which provides program of interest, e.g., a program selected or viewed prior to a switch to a secondary program channel, is referred to herein as a primary channel. The methods and apparatus of the invention are particular useful when the primary channel communicates linear program content, e.g., a real time sporting event or programming content which is streamed in a linear fashion precluding user skipping forward and not receiving content corresponding to commercial breaks. The methods and apparatus facilitate channel surfing and/or viewing of content different from that of the program available from the primary channel during commercials while providing a user an indication when the program on the primary channel has resumed. The alternative content viewed during a commercial presentation portion of the primary channel may be program content corresponding to a content source other than primary channel, e.g., a secondary channel.

The primary channel may be, and sometime is a program channel. Multiple program channels can and sometimes are communicated over a single physical channel. For example, multiple program channels may be used to communicate different programs over a single physical channel corresponding, e.g., to a single frequency band. The secondary channel may also be a program channel. The secondary program channel may correspond to the same or a different physical channel than the primary channel. The use of multiple tuners and demodulators facilitates, in at least some embodiments, switching between a primary channel and a secondary channel irrespective of whether the primary and secondary channels corresponding to the same physical channel. However, in cases where separate tuners are not needed to switch between program channels, e.g., because the digital packets corresponding to the different program channels are multiplexed on the same physical channel, multiple tuners are not needed to support the switching between a primary channel, e.g., first program channel and secondary channel, e.g., second program channel.

In various embodiments, a channel, e.g., program channel via which content is being supplied in a linear fashion for viewing is monitored to detect commercial portions communicated with or in said content. A user is provided an opportunity before or during a commercial to designate the channel being viewed as a primary channel. This may be done by selecting an option such as "Tell me when a break is over" while viewing a channel. Once the channel is designated as a primary channel, if the user switches from the primary channel during a commercial break, the channel will continue to be received, the program received on the primary channel will be decoded, and the end of the commercial break will be detected. During the commercial break the user is allowed to switch from the primary channel to another channel which is received and displayed. This may involve use of, e.g., a separate tuner and/or decoder, which is different form the tuner/decoder used to receive and recover the primary channel content.

While the user views content corresponding to another channel, e.g., a secondary channel, the primary channel is monitored for the end to the commercial break. In cases where buffering is supported, the content received on the primary channel is stored at least from the point where the end of the advertisement is detected. In some embodiments the commercial break portion of the primary program may also be recorded allowing a user to skip back to before the detected end of the commercial break if desired. Such embodiments are particularly desirable where the precise end of a commercial break may be difficult to predict. The buffering of a portion of a program or streamed content in the described manner maybe and normally is permitted/supported even in cases where the content is restricted from being recorded in its entirety and played back later or a device lacks sufficient memory to record the full program.

While viewing content during a commercial break received on a secondary channel, e.g., a channel other than the channel on which the program including the commercial break is received, the viewer is provided with an indication of when the commercial break on the primary channel ends and/or is automatically switched back to the primary channel at the end of the commercial break. In some embodiments the user is provided with an opportunity to enable/disable the automatic switch back feature by activating or deactivating the feature as a user setting which can be configured on the user's set top box or other device being used to receive and output content. In some embodiments the commercial break end indicator is provided whether or not the automatic switch back is enabled. In other cases if automatic switch back is enabled, the commercial break indicator is not provided while the secondary content, e.g., content received on the secondary channel, is being received and displayed.

The occurrence and duration of a commercial break may be detected in a variety of ways depending on the particular embodiment and the information communicated with or as part of a program being received and displayed on the primary channel. In some embodiments queue tones such as an SCTE 35 "out" queue tone included in a standard MPEG data field included with the program content is used to detect an advertisement is over, alternatively information such as an SCTE 35 "out" queue tone may be included in an MPEG private data field and/or other propriety signaling may be used to indicate the presence and duration of an advertisement. In some embodiments OOB (Out Of Band) signaling is sent over a DAVIC and/or DOCSIS communications channel in a manner that is synchronized with the video stream and/or program data to indicate the start, end and/or duration of an advertisement break or other break from a main program. The set top box or other device receiving the program can detect and use this information to identify the start of a advertisement break and when it is or will be over.

The commercial break end indicator is, in some embodiments, a pop up window or other on-screen display used indicate to a viewer that the commercial break on the primary channel has ended and/or will end in a predetermined number of seconds. In some embodiments where the duration of the commercial break is known, e.g., from duration information received via the primary channel, out of band signaling, or from other information, the commercial break end indicator is presented in the form of a countdown timer. Upon reaching zero the countdown time signifies that the commercial break has ended and may change color, e.g., change to red to indicate that the commercial break has ended. An audio indication, e.g., buzzer sound, may be, and sometimes is, also provided as part of the commercial break end indicator to gain the users attention when the commercial break ends and it is time for the user to switch back to the primary channel.

In response to the commercial break end indicator indicating the end of a commercial break, a viewer may indicate a desire to switch back to the primary channel by pressing a button on the remote control to trigger a switch back to the primary channel. In response to a signal, e.g., from a remote control, generated in response to a user indicating a desire to switch back to the primary channel, the set top box or other playback device begins outputting to the display the content of the primary channel and stops outputting the content from the secondary channel which the user was viewing during the commercial break.

In embodiments where buffering of a received program is not supported, the switch back to the primary channel results in the content received on the primary channel being output from the point in time the user switches back. However, in embodiments where program buffering is supported, playback from the primary channel is resumed from the point where the commercial break was detected as ending. In such embodiments even if the user does not switch back immediately to the primary channel, the user will not miss a portion of the primary program due to the buffering and, in cases where the buffering includes the commercial break portion even if the end of the commercial break was not accurately detected, the user is provided the opportunity to rewind or skip back to see the portion of the program which was included in what was detected to be a commercial break.

As should be appreciated the methods and apparatus described herein facilitate channel surfing and/or viewing of content on a secondary channel during linear content delivery performed on a primary channel while reducing and/or eliminating the risk that a user will miss a portion of the primary program as a result of the switch to watching a portion of a secondary program, e.g., a new broadcast, other sporting event, or some other content, during a commercial break which occurs in a primary program of interest, e.g., a live sporting event or other linear broadcast where content is being viewed as it is received and/or during the broadcast of the content.

In some embodiments the program on the secondary channel is recorded or buffered and the user is allowed to switch to the program on the secondary channel and continue viewing form the point the program on the secondary channel was last viewed. In such embodiments a user can switch, e.g., toggle between the primary and secondary program channel, and watch the full program on the secondary channel without missing portions thanks to the buffering. While the viewer may be only able to watch a portion of the secondary program during commercials of the primary program, this can still allow the user to watch a considerable portion of the secondary program during a long event on the primary channel and can be particularly desirable where a user may want to skip portions of the secondary program. For example, if the secondary program is a news program, a viewer may be able to fast forward and skip portions of the news program while toggling between the primary program and the secondary program during commercial breaks on the primary program channel.

The methods and apparatus of the present invention are well suited for use programs which are communicated in an analog or digital format where the device implementing the method is capable of receiving multiple programs, e.g., corresponding to different channels, at the same time. The methods and apparatus are particularly well suited for use in devices which include multiple tuners which can be tuned to different channels at the same time but can also be used in devices where multiple channels can be received without the use of multiple tuners, e.g., because the frequency band which can be received in processed provides sufficient bandwidth for multiple program channels to be received without the need for a separate tuners as maybe the case with digitally compressed program content communicated over relatively low bandwidth program channels.

While the methods and apparatus are particularly well suited for live or real time broadcasts such as sporting events, they can be used with a wide variety of linear broadcasts where the user receives the content in a linear fashion and does not have the opportunity to skip receipt of portions of the presentation, e.g., the advertisements.

Numerous additional variations and embodiments are described and discussed in the detailed description which follows.

It should be appreciated that numerous additional variations and embodiments are possible and remain within the scope of the invention.

Various additional features, embodiments and advantages of the present invention are discussed in the detailed description which follows.

BRIEF DESCRIPTION OF THE DRAWINGS

FIG. 2, which comprises a combination of FIGS. 2A, 2B and 2C, is a flowchart illustrating the steps of an exemplar method of operating a customer device, e.g., a set top box, in accordance with an exemplary embodiment implemented using the system shown in FIG. 1.

DETAILED DESCRIPTION

Figure 1:
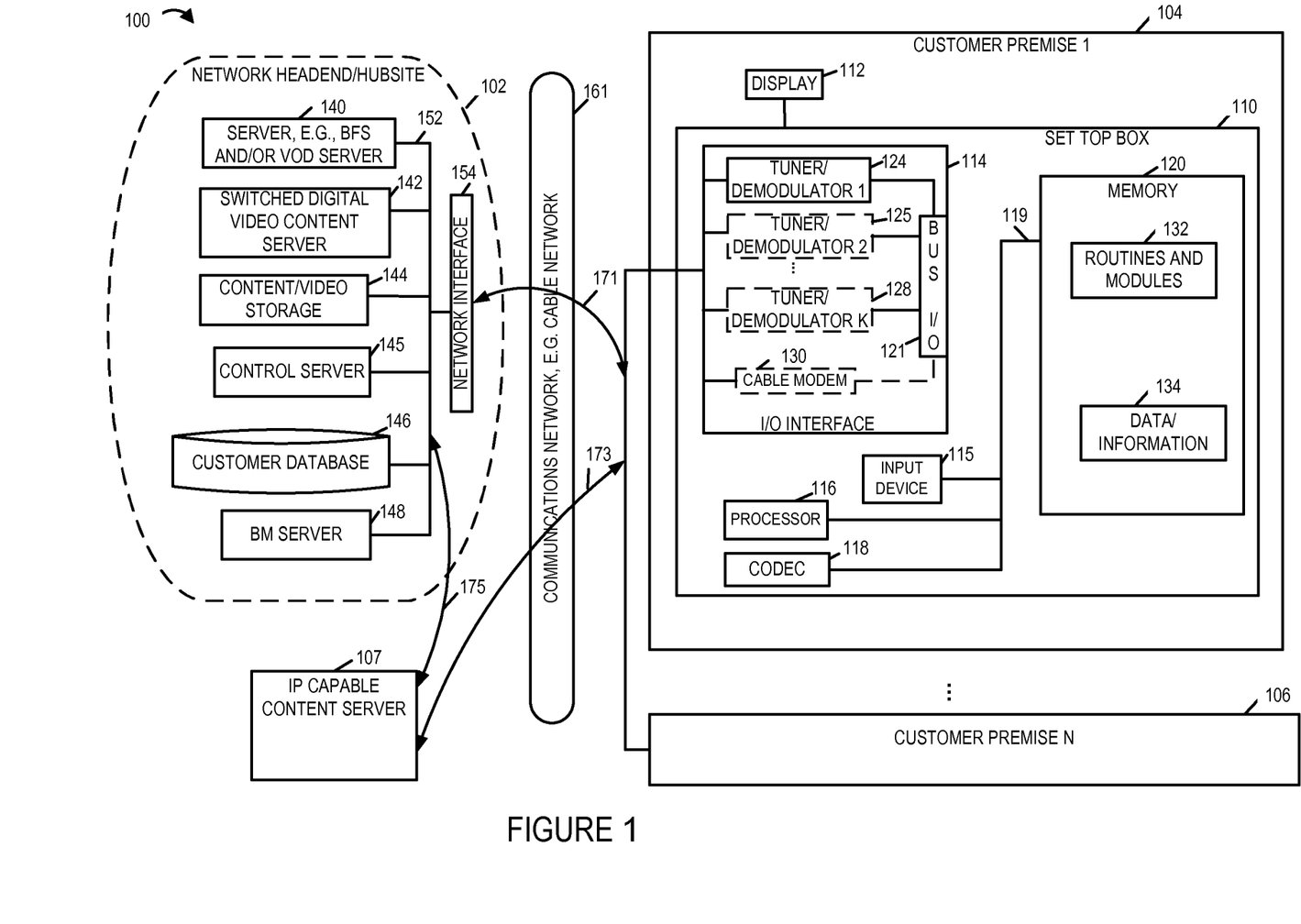
FIG. 1 illustrates an exemplary system implemented in accordance with the some embodiments of the present invention.

FIG. 1 illustrates an exemplary system 100 implemented in accordance with one exemplary embodiment of the present invention. The system 100 supports delivery of content to customer premise equipments (CPEs) including content playback devices in accordance with various embodiments of the invention. The system 100 includes a network headend 102, a cable network 161, e.g., a hybrid fiber-coaxial (HFC) network and/or internet, an IP capable content server 107, and a plurality of customer premises 104, 106. In various embodiments the content, e.g., multimedia content, is delivered from the headend 102 and/or IP content server 107 over the cable network 161 to one or more content playback device depending on the playback device capability and/or user preference. In some embodiments the customer content playback devices at the customer premises are IP (internet protocol) capable, that is, they support communications over IP.

The network headend 102 may be implemented at a cable network office or hubsite serving a plurality of customer premises and includes multiple servers and databases which are coupled together as shown. In the FIG. 1 example, the headend 102 includes a content server, e.g., a broadcast file server (BFS) and/or a video on-demand (VOD) server 140, a switched digital video (SDV) content server 142, a content storage 144, a customer database 146 a business management server 148 and a control server 150. It should be appreciated that some of the servers and/or elements shown to be included in the headend 102 may reside outside the headend 102 in some embodiments and may be located anywhere in the system 100, e.g., in a distributed manner. In the FIG. 1 example, various servers and other elements included in the headend 102 are coupled together by a local network 152. The local network 152 is coupled via one or more network interfaces 154 to other networks and/or devices. For example, the headend 102 is coupled via network interface 154 to communications network 161, e.g., a cable network, and may also be coupled to one or more other external networks.

Via the cable network 161, the IP content server 107 and the elements shown in the network headend 102 can send and/or exchange various information with the devices located at the customer premises 104, 106. As shown in FIG. 1, communications link 171 traversing the cable network 161 couples the CPEs at the customer premises 104, 106 to the various elements/servers shown in the network headend 102. Communications link 173 traversing the cable network 161 couples the CPEs at the customer premises 104, 106 to the IP content server 107. Communications link 175 couples the IP content server 107 to the various elements/servers shown in the network headend 102 and the elements can communicate and/or exchange information.

The content server 140, e.g., a broadcast file server (BFS), among other things, is responsible for delivering, e.g., broadcasting, programming content including video on-demand content ordered by one or more customers and/or other information to one or more customer devices, e.g., set top boxes, which support receiving content by tuning to, e.g., QAM broadcast stream broadcast by the server 140. The switched digital video (SDV) content server 142 provides digital programming content to one or more content playback devices which support receiving SDV content. In various embodiments the content servers 140, 142 access the programming content from the content storage 144 and generate transport streams suitable for delivery to various CPEs via the communications network 161. The content storage 144 stores content, e.g., audio, video and/or other multimedia content. In some embodiments the content stream is encrypted prior to delivery to the CPEs over the communications network 161.

The control server 145 controls the operation of various other elements of the headend 102 and responds to requests received from customer devices. Among other things the control server 145 in some embodiments is configured to send information regarding location, start, end and/or duration of commercial breaks on various channels to which a user is tuned too the customer devices located at customer premises 104, 106. In some embodiments such commercial break related information is communicated by the control sever 145 to customer device using out of band signaling, e.g., over a DAVIS and/or DOCSIS communications channel. In some other embodiments the control server 145 controls the BFS and SDV servers 140, 142 to include, e.g., embed, such information in the content stream carrying the programming content. Thus in some embodiments such information is included in the content stream, e.g., in one or more MPEG private data fields or specific queue tones, communicated from the content servers to the customer devices. The customer device receiving such information can use this information to identify the start of an advertisement break and when it is or will be over.

The customer database 146 includes, for a plurality of customers, customer information, account information and information regarding the devices installed at customer premises. In some embodiments customer account information includes, e.g., customer account number, customer subscription/service information, customer device capability and other billing related information. Customer database 154 also includes customer device information, e.g., identification and/or other information regarding customer devices such as STBs, cable modems etc., installed at various customer premises served by the headend 102. BM (Business management) server 148 processes billing information corresponding to customers serviced by the headend 102. This may include updating billing charge information in response to changes in services being provided to the customer, upgrades, on-demand content purchases, and/or other activity.

In various embodiments the IP content server 107 supplies unicast IP program content streams to one or more IP content playback devices located at customer premise 104, 106 served by the IP content server 107.

Referring now to the customer premises shown in the system. Each customer premise 104, 106 may include a plurality of CPEs including content playback devices. In various embodiments the CPEs located at the customer premises include, e.g., modems, routers, and content playback devices including, e.g., set top box, internet capable TVs, personal computers, laptops, tablet devices, smart phones etc. In various embodiments a content playback device presents the program content to a viewer, e.g., a customer/subscriber.

FIG. 1 shows some details of customer premise 1 104. Customer premise N 106 may be similar to the customer premise 104 and may include same or similar CPEs. In FIG. 1 embodiment, customer premise 104 includes a STB 110 coupled to display device 112. It should be appreciated that in some embodiments content playback devices can be integrated in a device which also includes a display. The display devices could be, e.g., standard televisions. The STB 110 may be, e.g., a DOCSIS (Data Over Cable Service Interface Specification) set top box, an SDV capable set top box and/or an IP capable device. In some embodiments one or more customer premises include IP capable content playback devices which receive IP program content streams from the IP content server 107. The SDV capable set top box devices support receiving SDV programming content from the headend 102 over the communications network 161. An IP capable STB or another IP device could be any of a variety of devices that support communications over IP, e.g., cell phones, tablet devices such as iPAD, computers etc.

In the illustrated embodiment of FIG. 1, the exemplary STB 110 includes, among other things, an I/O interface 114 with at least one tuner/demodulator pair 124, an input device 115, a processor 116, a codec 118, a memory 120 coupled together by a bus 119. In some embodiments the I/O interface 114 includes a cable modem 130 and/or a plurality of additional tuners and demodulator pairs 125 through 128. Each tuner/demodulator pair can be used to tune to a frequency band to receive video and/or data content from the BFS 140 and/or SDV server 142. In some embodiments the STB 110 receives via the cable modem 130 programming content via unicast IP streams from the IP content server 107.

In some embodiments the STB 110 includes tuner/demodulators 124 through 128 but does not include the cable modem 130. In still other embodiments the STB 110 includes both tuner/demodulator pairs 124 through 128 and cable modem 130. Thus it should be appreciated that a variety of implementations are possible and a wide variety of content playback devices can be supported by the gateway 122. The memory 120 includes various control routines and modules 132 and data/information 134. The various modules perform various functions in accordance with the invention. The operation of the exemplary STB 110 and the functions of various modules are discussed later in detail.

In accordance with one aspect of some embodiments, when a user watching program content, e.g., a movie, TV show, live programming, etc., on a first channel switches to another, e.g., a second, channel during a commercial break on the first channel, the user is provided an option to be notified regarding the end of the commercial break while the user is watching content on the second channel following the switch and/or to automatically switch back to the first channel at the end of the commercial break. Based on user's preference a notification regarding the end of the commercial break is generate and provided by the customer device, e.g., STB, while the user is watching content on the second channel. Thus an indication is provided to the user indicating that the commercial has ended and the programming has resumed thereby allowing the user to switch back to the primary channel without missing the programming content that resumed after the commercial break. Such a feature obviates the need for the user to manually keep switching back and forth between channels to check if the commercial break has ended or not. Such features also enable the user to watch two programs on two different channels with the user being able to alternatively view the programs and switching between the channels whenever a commercial break occurs on either of the two different channels.

Figures 2, 2A:
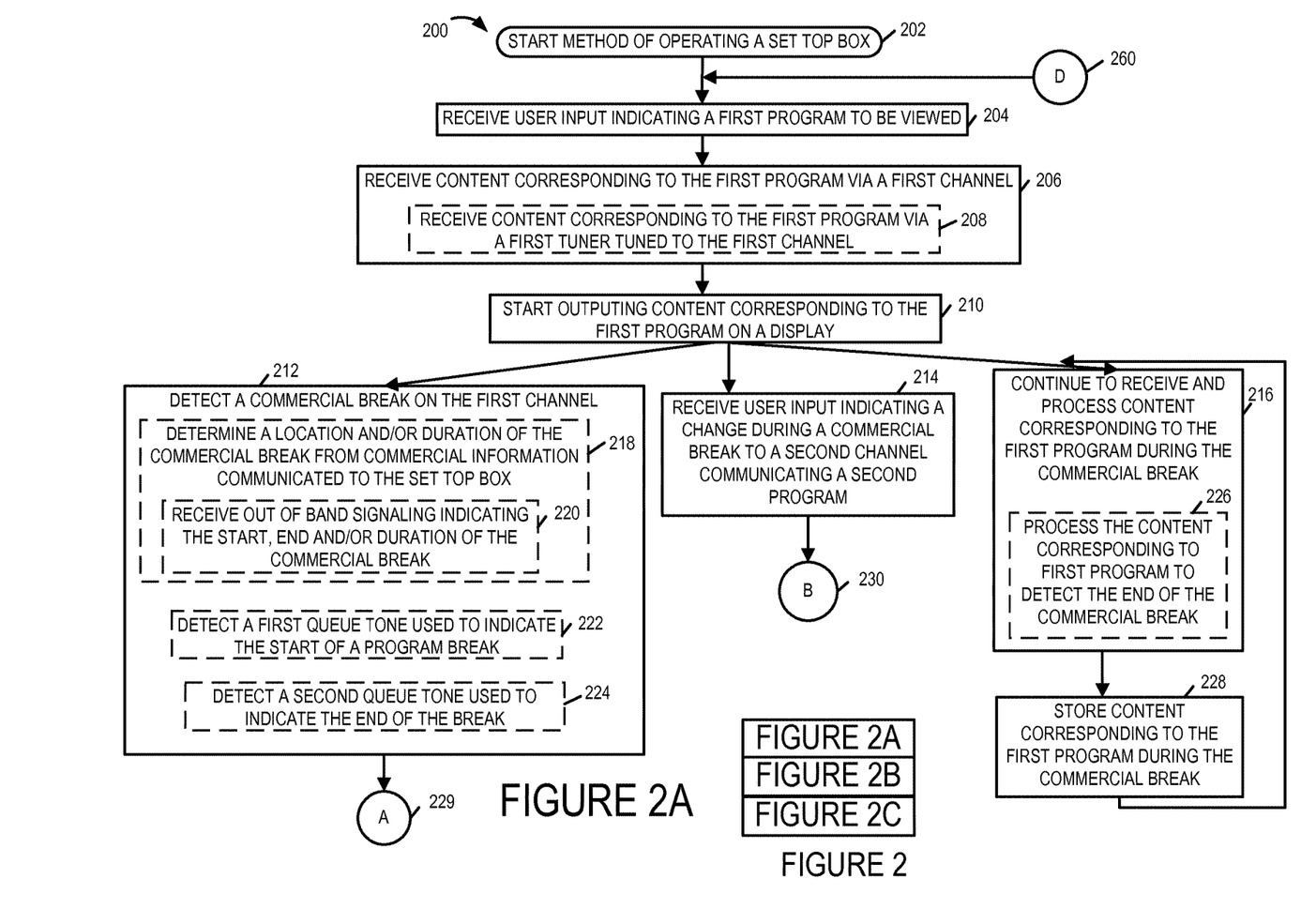
Figure 2B:
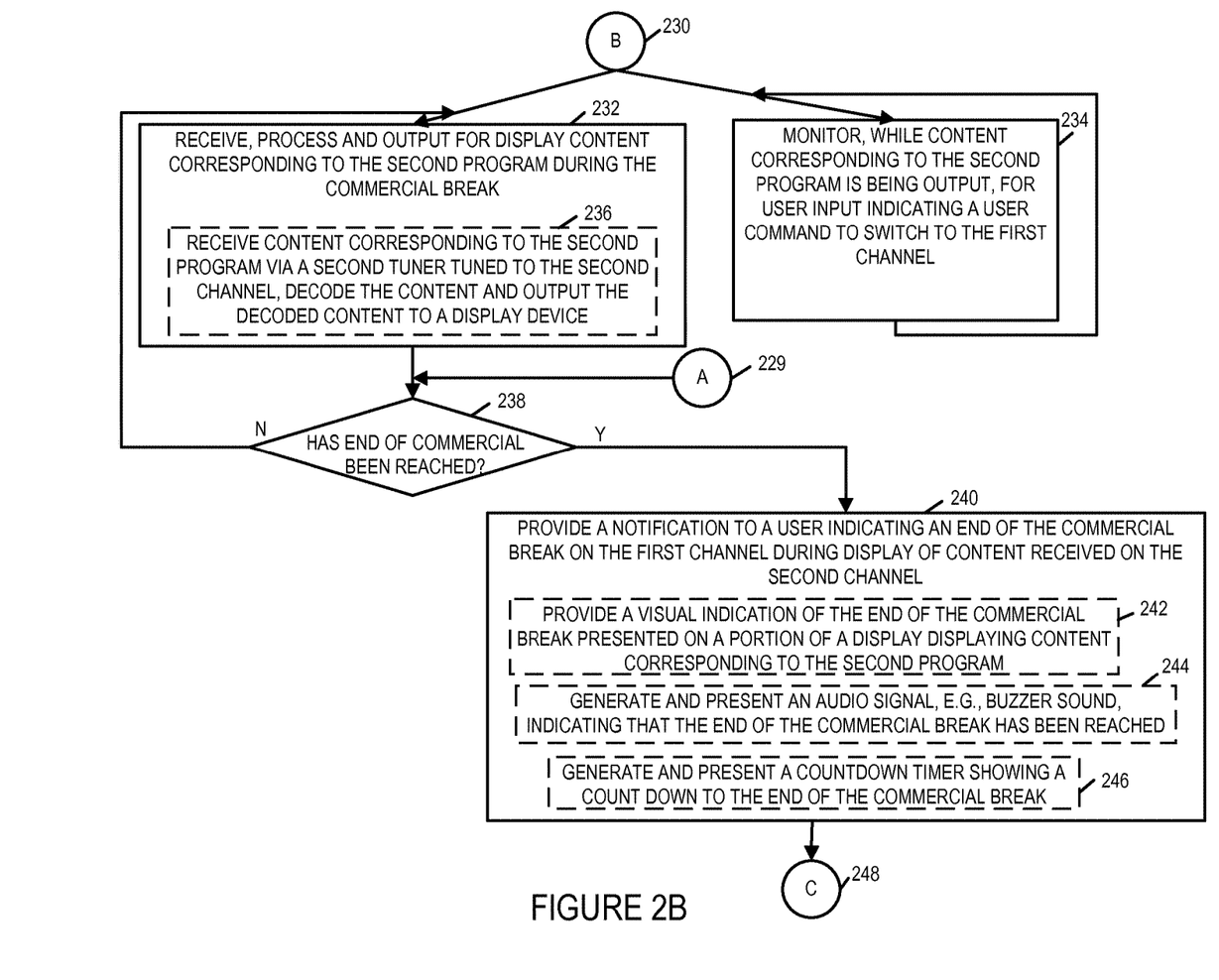
Figure 2C:
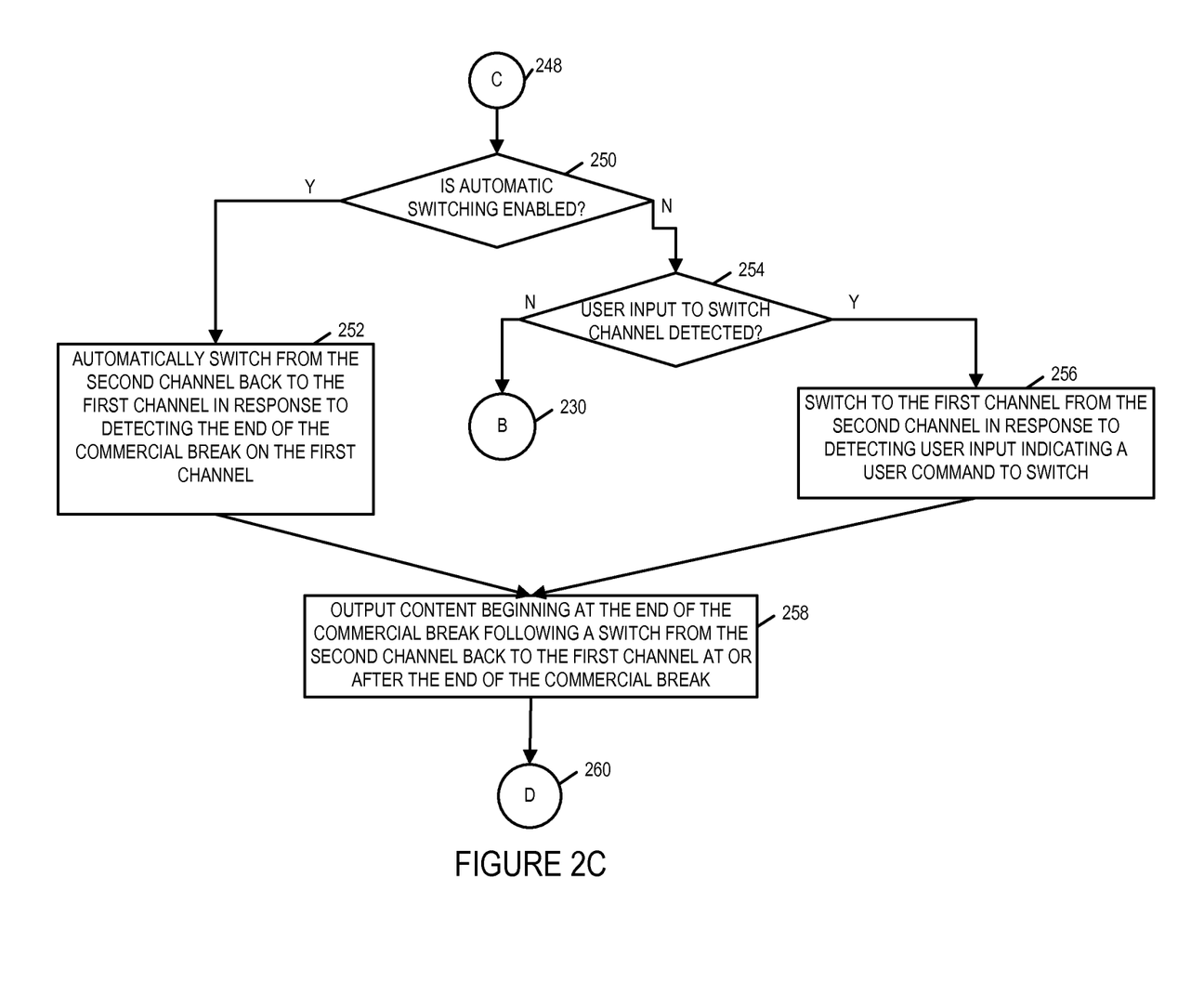

FIG. 2, which comprises a combination of FIGS. 2A, 2B and 2C, is a flowchart illustrating the steps of an exemplar method of operating a customer device, e.g., a set top box, in accordance with an exemplary embodiment implemented using the system shown in FIG. 1. The set top box implementing the method maybe, e.g., the set top boxes 122 shown in FIG. 1.

The method starts in step 202, e.g., with the set top box being powered on. Operation proceeds from start step 202 to receive step 204 in which user input indicating a first program to be viewed is received. The content selection may be made by a user viewing a program guide by selecting the first program for viewing and/or by the user entering a program channel number corresponding to the channel on which the first program is received. Based on the user input the STB takes action to start displaying the content corresponding to the selected first program. The user may select a control option to designate the first program as a primary program or may indicate that the selected program is to be treated as a primary program when a program break is detected and the user wants to switch to a secondary channel.

Operation proceeds from step 204 to step 206. In step 206 the STB starts receiving content corresponding to the first program via a first channel. Step 206 in some embodiments includes performing step 208 wherein the STB receives the content corresponding to the first program via a first tuner, e.g., tuner 124, of the STB tuned to the first channel.

Operation proceeds from step 206 to step 210. In step 210 the STB starts outputting the content corresponding to the first program on a display device, e.g., on a television display.

Operation proceeds from step 210 to steps 212, 214 and 216 which may be performed asynchronously in parallel in some embodiments. In step 212 the STB detects a commercial break on the first channel, e.g., while outputting the first program content on the display. The commercial break may be detected in a variety of ways which are discussed in sub-steps 218, 220, 222, and 224. In some embodiments one or more of these sub-steps may be performed as part of step 212 to detect the commercial break. As illustrated in step 218 in some embodiments the STB determines a location (time wise) of the commercial break from advertisement/ commercial information communicated to the STB, e.g., from the headend 102 or another server. In some embodiments the advertisement/commercial information is received via out of band signaling indicating the start, end and/or duration of the commercial break as shown in sub-step 220. In some other embodiments the commercial break timings and/or duration is detected by identifying corresponding queue tones as illustrated in steps 222 and 224. In sub-step 222 the STB detects a first queue tone used to indicate the start of a commercial break. Thus by detecting and identifying this queue tone the STB concludes that the commercial break has started. In sub-step 224 the STB detects a second queue tone used to indicate the end of the commercial break. Thus by detecting this queue tone the STB concludes that the commercial break has ended. Thus it should be appreciated that the determination regarding the commercial break timing and duration could be made in various possible ways. Operation proceeds from step 212 to step 238 via connecting node A 229.

Returning to step 214. In step 214 the STB receives a user input indicating a change, e.g., channel change request, during a commercial break to a second channel communicating a second program. While watching the first program content which is being output when the user realizes that a commercial break has occurred, e.g., with a commercial advertisement started being displayed, the user may simply change the program channel. The program channel change may be requested, e.g., by sending program channel change signal via a remote control device and/or by pressing a button on the STB or by various other ways. Such a channel change request is received and processed by the STB in step 214. In some embodiments a channel change initiated by a user during a commercial break will be treated as an indication the program being viewed is to be treated as a primary program and should continue to be received despite the channel change with the user being provided commercial break end information or a commercial break end notification while viewing the channel to which a switch is made, e.g., a secondary channel. Operation proceeds from step 214 to steps 232 and 234 via connecting node B 230.

Returning to step 216. In step 216 the STB continues to receive and process content corresponding to the first program during the commercial break. Step 226 is optionally performed in some embodiments as part of step 216. In step 226 the received content corresponding to the first program is processed to detect the end of the commercial break. This step need not be performed is the commercial break duration is known from in band or out of band signaling since the beginning and end of the commercial break is known in such embodiments. The processing of the content in step 226 may continue after it has been detected that a commercial break has started in order to determine when the break will end.

Operation proceeds from step 216 to step 228. In step 228 content corresponding to the first program during the commercial break is stored, e.g., in a storage buffer in the STB. As indicated by the loopback the steps 216 and 228 maybe and sometimes are performed on an ongoing basis. Thus in accordance with one feature of some embodiments when the commercial break is detected and even if the user changes the program channel to view some different content, the STB continues to receive, process and store the content corresponding to the first program during the commercial break although the content is not output on the display device if the user has changed the channel to watch other content during the break.

Referring to FIG. 2B and step 232. Following receipt of a user input in step 214 to change to a second channel during the commercial break, in step 232 the STB switches to the second channel and starts receiving, processing and outputting for display the content corresponding to the second program during the commercial break. In some embodiments step 232 includes performing step 236 where the STB receives the content corresponding to the second program via a second tuner tuned to the second channel and decodes the content and outputs the decoded content corresponding to the second program, e.g., on the display device. In some embodiments switching to the second channel does not require tuning via the second tuner to the second channel. For example in case of digital channels a single frequency band (corresponding to a physical channel) to which a tuner is tuned can receive multiple, e.g., 5, different program channels where corresponding programming content can be received. Thus it should be appreciated that changing a program channel in some cases require tuning to a different frequency (physical channel) however this may not always be the case. Operation proceeds from step 232 to step 238.

Step 234, which in some embodiments is performed in parallel with step 232, will now be discussed. In step 234 the STB monitors, while the content corresponding to the second, e.g., secondary, program is being output, for a user input indicating a user command to switch back to the first channel. The user may manually indicate a desire to switch back to the primary program channel prior to completion of the commercial break or after the end of the break. The loopback indicates that the step 234 maybe and sometimes is performed on an ongoing basis, e.g., with user input being monitored and processed to detect a user command to change back to the primary channel which maybe signed via a remote control or other user input device.

Returning to step 238. In step 238 the STB checks if the end of the commercial break has been reached. It should be appreciated that the output of step 212 (including one or more of steps 218, 220, 222 and 224) is an input to step 238. If it is determined that the commercial break end has not been reached the operation proceeds back to step 232 and the STB continues to receive, process and output content corresponding to the second program to the user. If it is determined that the commercial break end has been reached the operation proceeds from step 238 to step 240.

In step 240 a notification is provided to the user, during display of content corresponding to the second program on the second channel, indicating that an end of the commercial break on the first channel has been reached. In some embodiments one or more of steps 242, 244 and 246 may be performed as part of step 240 as illustrated in the Figure. As part of providing a notification to the user in some embodiments in step 242 a visual indication of the end of the commercial break is presented on a portion of the display displaying content corresponding to the second program. In some embodiments as part of providing a notification step 244 is performed where the STB generates and presents an audio signal, e.g., buzzer sound, indicating that the commercial end has been reached. In some embodiments an audio signal is presented along with a visual indication on the display screen. In still some embodiments as part of providing a notification step 246 is performed where the STB generates and presents, e.g., on the display screen, a countdown timer showing a countdown to the end of the commercial break. The timer may change color upon reaching the end of the commercial break, e.g., reach zero. In the case where step 246 is performed, the notification is provided prior to the end of the commercial break. Thus in such a case the STB needs to determine the duration of the commercial break and track the time elapsed since the start of the commercial break in order to provide this type of notification. The duration of the commercial may be determined based on received information and/or detected queue tones or other signals.

Operation proceeds from step 240 to step 250 via connecting node C 248. In step 250 the STB checks and determines if automatic switching to the primary channel, e.g., the first channel, has been enabled by the user. This may involve checking a user setting stored in memory, e.g., to see if automatic switch back has been enabled by the user. In various embodiments an automatic switch back feature is provided to the user which when enabled control the STB to switch back, at the end of a commercial break, to the channel that the user was viewing when the commercial break occurred. The automatic switch back is, in some embodiments a default setting which can be altered by a user. In some embodiments the user can just enable the auto switchback option and even disable notifications regarding the end of the commercial break. In such a case when the user is watching a secondary channel during the display of a commercial on the primary channel, the STB does not provide notifications regarding the end of commercial break on the primary channel and simply switches back to the primary channel and displays content corresponding to the program the user was viewing on the primary channel at or a few seconds before the end of the commercial break. In some embodiments both automatic switch back and notifications are enabled.

If in step 250 it is determined that the automatic switch back is enabled the operation proceeds from step 250 to step 252. In step 252 the STB automatically switches from the second channel to the first channel in response to detecting the end of the commercial break on the first channel or reaching a predetermined point in time before the end of the commercial break. In some embodiments the notification regarding the end of commercial break is provided for a brief time period and then the STB switches back to the first channel. Operation proceeds from step 252 to step 258.

If in step 250 it is determined that the automatic switch back has not been enabled the operation proceeds from step 250 to step 254. In step 254 the STB determines if a user input to switch back to the first channel has been detected. If it is determined that a user input to switch to the first channel has not been detected the operation proceeds from step 254 back to steps 232 and 234 via connecting node B 230 and the STB may continue the operations discussed with regard to steps 232 and 234. However if is determined that a user input to switch to the first channel has been received the operation proceeds from step 254 to step 256. In step 256 the STB switches back to the first channel from the second channel in response to detecting the user input indicating the user command to switch. Operation proceeds from step 256 to step 258.

In step 258 the STB outputs content corresponding to the first program, beginning at the end of the commercial break following a switch from the second channel back to the first channel, at or after the end of the commercial break. Outputting the content includes displaying the content on the display device. Thus when the commercial break is over the STB outputs, following switching to the first channel, the content corresponding to the first program to the user on the display device. In some embodiments in case of manual switching to the first channel following display of a notification that the commercial break has ended, if the first program is a live event and there has been a delay in receiving a channel switch signal from the user, the STB still outputs the content corresponding to the first program starting from a point where the commercial break ended so that the user does not miss the portion of the first program which was received prior to switching back to the first channel. If the user delays switching back to the first channel after the commercial break has ended the STB records, e.g., buffers, the portion of the content corresponding to the first program following the end of the commercial break and is able to present it to the user, whenever the user manually switches back to the first channel, from the point where the commercial break ended. Operation proceeds from step 258 back to step 204 and the operation continues in this manner. When the switch back occurs, in some embodiments the program on the secondary channel will continue to be received, e.g., by a secondary tuner, and recorded. A switch back to the secondary channel may result in content being played back from the point where the user last viewed the program on the secondary channel or from the point in the program currently being received. In either case, buffering of the secondary program allows the user to view the entire secondary program if desired. thus, in at least some embodiments a user can switching between the primary and secondary programs and skip commercials on each of the primary and secondary channels if desired.

Figure 3:
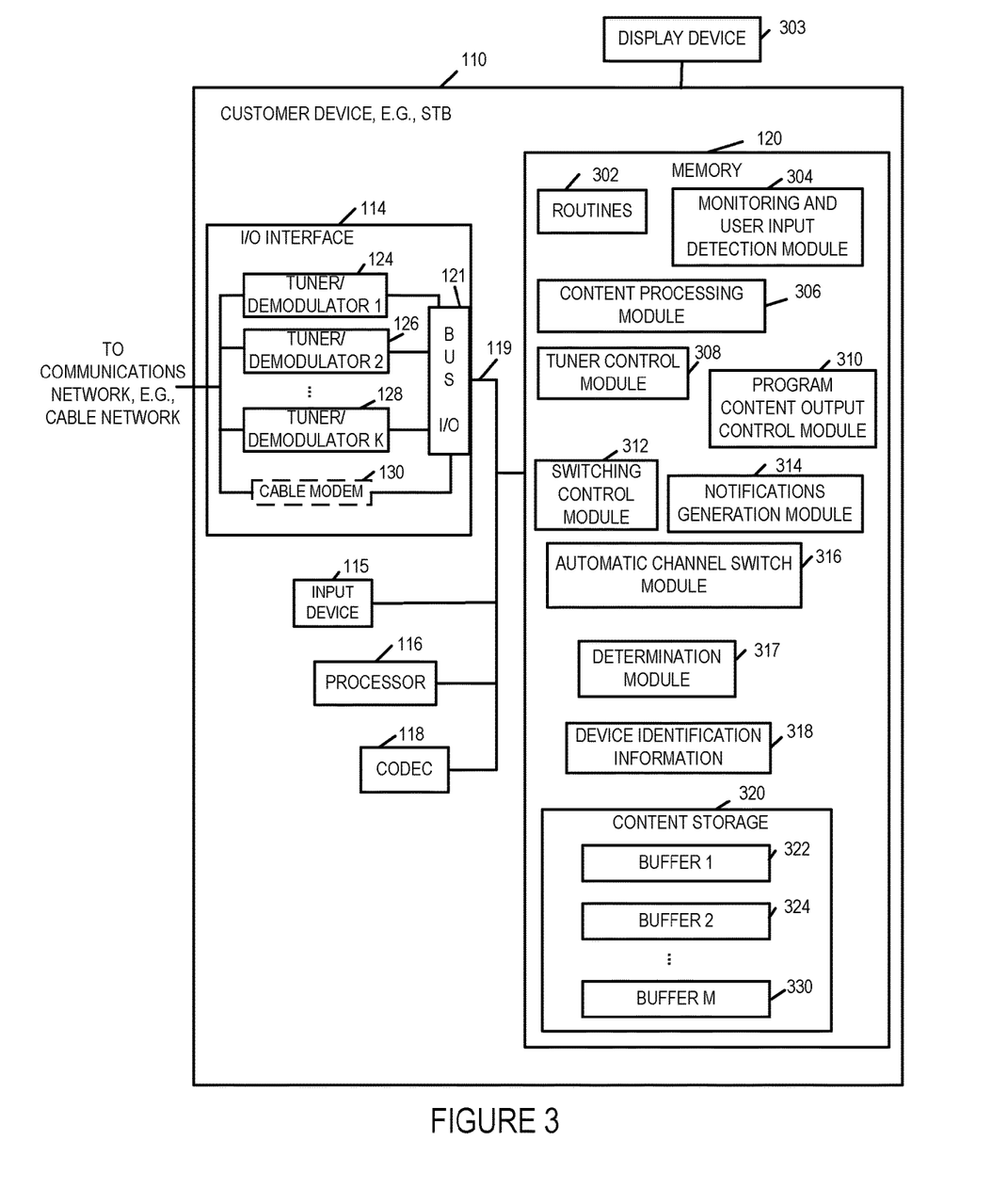
FIG. 3 illustrates an exemplary customer device, e.g., a set top box, implemented in accordance with some exemplary embodiments.

FIG. 3 illustrates the exemplary set top box (STB) 110 and various elements of the gateway device in greater detail. The exemplary set top box 110 can be used to implement the method of flowchart 200.

As shown, the STB 110 includes an input/output (I/O) interface 114, e.g., cable network interface, an input device 115, a processor 116, codec 118, and a storage device, e.g. a memory 120, coupled together via a bus 119. The various elements of the STB 110 can exchange data and information over the bus 119.

In the illustrated embodiment the I/O interface 114 includes a plurality of tuner/demodulator pairs including tuner/demodulator pair 1 124 through tuner/demodulator K 128 and optionally an in-built cable modem 130. The tuner/demodulator pairs and the cable modem 130 are coupled to the bus 119 via the bus interface 121. Via the interface 114, the STB 110 can exchange signals and/or information with other devices and/or system elements such as the servers in the network headend 102, over the cable network 161. The interface 110 supports the receipt and/or transmission of content, and/or other information from/to different servers, e.g., the BFS 140, SDV server 142, IP content server 107 etc. In addition, the I/O interface 402 in some embodiments also includes, e.g., an infrared signal receiver to receive signals from a user remote control device. Thus in some embodiments the I/O module 402 may include, in addition to a cable network interface, an IR or radio interface for receiving signals from a remote control device.

Each tuner-demodulator pair in the plurality of tuner/demodulator pairs 124 through 128 is capable of tuning to a frequency band to receive programming content and demodulating the received content and/or information. Thus in various embodiments the I/O interface 114 receives content. In some embodiments the I/O interface 114 is configured to receive content corresponding to a first program, e.g., via a first tuner/demodulator 124 tuned to a first channel. In some embodiments the I/O interface 114 is configured to receive content corresponding to a second program, e.g., via a second tuner/demodulator 126 tuned to a second channel, during a commercial break on the first channel. In accordance with one feature of some embodiments the STB 110 continues to receive the content corresponding to the first program via the first tuner/demodulator 124 during the commercial break. In various embodiments content received via I/O interface 114 is processed and passed on to the modules for further processing and/or output on the display 303. In some embodiments the STB 110 receives content from the IP content server 107, e.g., via unicast IP content stream, via the cable modem 130.

The input device 115 may be a keypad, touch screen, and/or a microphone for receiving and processing voice input commands. The processor 116, e.g., a CPU, executes routines 302 and one or more modules and controls the STB 110 to operate in accordance with the invention. The processor 116 is responsible for controlling the general operations of the STB 110 including, e.g., presentation of information and/or programs for display. Thus to control the STB 110, the processor 116 uses information, various modules and/or routines including instructions stored in memory 120. The Codec 118 is implemented as a module and is capable of performing encoding and/or decoding operations on a digital data stream or signal. In addition to the routines 302, the memory 120 includes a monitoring and user input detection module 304, a content processing module 306, a tuner control module 308, a program content output control module 310, a switching control module 312, a notifications generation module 314, an automatic channel switch module 316, a determination module 317, device identification information 318, and a content storage 320.

Routines 302 include communications routines and/or device control routines. The monitoring and user input detection module 304 is configured to monitor for and detect user inputs, e.g., input signal from a user received by the STB 110. The user input may be sent by a control device such as a remote control, or by other means, e.g., selecting an option by pressing a button on the STB 110 or an icon on a touch screen etc. In some embodiments user input signals from a remote control may be received via I/O interface 114 and passed on to the monitoring and user input detection module 304 for processing. In some embodiments the monitoring and user input detection module 304 is further configured to receive user input indicating a change, during a commercial break on a first channel communicating a first program that a user is watching, to a second channel communicating a second program. In some embodiments the monitoring and user input detection module 304 is further configured to monitor, while content corresponding to the second program is being output for display, for user input indicating a user command to switch back to the first channel. The monitoring and user input detection module 304 determines, on receipt of an input, e.g., a control signal providing user input, what type of selection has been made by the user, e.g., a channel selection/change command instructing to tune to a specific channel, a program guide selection, or another input. In some embodiments when a user input indicating a channel change from, e.g., a first channel to which the user is tuned to a second channel, is detected by the detection module 304 during a commercial break on the first channel, the input detection module 304 is further configured to present an option to the user, e.g., on the display 303, to enable automatic switching and/or enable commercial end notifications. For example the user may be presented a message prompting the user to select at least one of: "Enable automatic switch back to this channel when commercial end" or "Notify me when the commercial ends". If the user selects one of the presented options the input detection module 304 stores the user's selected response, as a user's preferred action. This information is then provided to the notifications generation module 314 and/or automatic switching module 316 to take preferred action when the commercial ends.

The content processing module 304 is configured to process information and/or the received content, e.g., programming content, received in a content stream from a content server. The content processing module 304 recovers the content and supply recovered content to one or more other modules in accordance with the features of the invention, e.g., for further processing and/or out for display. The content processing module 304 is further configured to process received content corresponding to a first program on a first channel to detect the start, end and/or duration of a commercial break in the received content in accordance with the features of the invention. The received content may include programming content such as movies, shows etc., as well as advertisement related information such as start and end times, location and duration of commercial breaks in a received content stream. The content may be received, e.g., via the I/O interface 114.

The tuner control module 306 controls the tuner-demodulator pairs by providing them with information and/or parameters needed to tune to a given channel, e.g., a frequency band, to receive program content at a given time. Thus the tuner control module 306 is configured to control one or more tuner-demodulator pairs to tune to a frequency corresponding to a program channel to be viewed, e.g., a user selected channel. In some embodiments the tuner control module 326 manages the allocation of different tuner-demodulator pairs for tuning to different channels when the user desires to switch from a first channel to a second channel during a commercial break on the first channel with the option that the user be notified upon end of the commercial break in accordance with the feature of some embodiments. The tuning information and/or other parameters may be received in a standard manner from the headend 102 and/or other server supplying the content.

The program content output control module 310 is configured to control the presentation of program content from the STB 110 to the user, e.g., on the display device 303. For example during operation when a user is tuned to a first channel communicating a first program that the user wants to watch, the program content output control module 310 controls the STB 110 to output, e.g., to the display device 303, content corresponding to the first program being received over the first channel. In some embodiments the module 310 is further configured to output content corresponding to the second program for display during the commercial break on the first channel, e.g., when the user has switched to the second channel. Output of a program may, and in some embodiments is, performed by supplying the program content to a display or other device, e.g., for presentation to a user. In embodiments where the playback device includes the display, e.g., in tablet, cell phone and/or many other playback device embodiments, output of the program is performed by causing the display included in the playback device to display program content on the playback device's display.

The switching module 312 is configured to switch the channel, e.g., from the first channel to the second and/or vice versa, when a user input to change the channel is detected. Thus when a user input indicating a channel change from the first to second channel is detected the switching module 312 changes to the second channel and controls the content output control module 310 to output content corresponding to the second channel on the display. In various embodiments when a channel switch signal is detected by the STB 110 to switch back to the first channel from the second channel the content output control module 310 outputs the content corresponding to the first program beginning at the end of the commercial break following the channel switch from the second channel back to the first channel at or after the end of the commercial break.

The notifications generation module 314 is configured to generate and provide a notification to a user indicating an end of the commercial break on the first channel during display of content received on said second channel. Thus in some embodiments when the commercial break on the first channel ends the notifications generation module 314 presents a notification to the user indicating that the commercial break has ended. In some embodiments the notification is a visual indication of the end of said commercial break presented on a portion of a display displaying said content corresponding to the second program. In some embodiments the notifications generation module 314 is configured generate and provide a countdown timer showing a count down to the end of the commercial break. In some embodiments the notifications generation module 314 is configured generate and provide an audible signal indicating that the end of the commercial break has been reached, as part of being configured to generate and provide a notification to the user indicating an end of the commercial break on the first channel.

The automatic channel switching module 316 is configured to automatically switch from the second channel back to the first channel in response to detecting the end of the commercial break on the first channel. In some embodiments the user is provided an opportunity to enable automatic channel switching upon end of a commercial break on a channel. When automatic channel switching is enabled the automatic channel switching module 316 becomes active and automatically changes channels, upon end of a commercial break, in accordance with the features of the invention. For example when the user watching a first channel changes to a second channel during a commercial break, then upon end of the commercial break on the first channel, if automatic channel switching is enabled, the automatic channel switching module 316 controls the STB 110 to switch from the second channel back to the first channel.

The determination module 317 is configured to detect and determine a location and duration of a commercial break, e.g., commercial break on the first channel, from commercial information communicated to the set top box 110, e.g., from one or more MPEG private data fields communicated with MPEG encoded program content. In some embodiments the determination module 317 is further configured to detect (i) a queue tone used to indicate the start of a program break, e.g., an SCTE 35 "out" queue tone, and (ii) another queue tone indicating an end to the commercial break, as part of determining a location and duration of a commercial break. In some embodiments the determination module 317 is configured to detect a commercial break using out of band signaling indicating the start and the end or duration of the commercial break, e.g., DAVIC and/or DOCSIS communicated information.

In some embodiments, one or more of the various modules discussed above work in coordination, e.g., with operations being merged to perform a function, to produce a desired output in accordance with the exemplary methods of the invention.

The device identification information 318 may include, e.g., Media Access Control (MAC) address of the STB device 110 or some other identifier identifying the STB 110. The content storage 320 includes a plurality of buffers for storage of program content received via the one or more tuner/demodulator pairs. The content storage 320 includes buffers 1 320 through M 330. In one embodiment K=N, e.g., there are as many buffers as the tuner-demodulator pairs in the STB 110. The STB 110 may assign an individual buffer from the buffers 322 through 330 to store program content received by a tuner-demodulator pair. In some embodiments multiple tuner/demodulators pairs are optional in the STB 110. Thus in some embodiments the STB 110 does not include multiple tuner/demodulators pairs but rather a single tuner/demodulators pair.

Various features of the embodiments described above allow a user, who switches to a second channel during a commercial break on a first that channel that the user was tuned to, to get a notification while watching program content on the second channel that commercial break on the first channel has ended and/or user desired content on the first channel has resumed.

Some examples in accordance with the features of some embodiments are discussed below:

Consider a user watching a desired program on a first channel. When the program takes a commercial break, in accordance with one feature of some embodiments the user is provided an option to designate the first channel as a primary channel and select a notifications option, e.g., "tell me when the break is over" option in the STB user interface through remote control/menus. In accordance with the features of the invention the STB remains tuned to the first channel, and begins scanning for the end of the commercial break. The commercial break may include multiple advertisements. After enabling the option to notify when the commercial break is over the user tunes away from the first channel using the remote control to a second channel, e.g., using another tuner to tune to the second channel, keeping the original tuner tuned to the first channel on. User may continue to surf and may switch to a third channel using remote control. However in some embodiments the STB still does not use the tuner used for the first channel thereby leaving the original tuner to continue to be tuned to the first channel so that the STB can continue receiving the content on the first channel. For discussion purposes consider that the user switches to the second channel and starts watching a second program on the second channel.

While the user is watching the second program, when it is detected that the commercial break on the first channel has ended and/or the desired programming has resumed, the STB displays a pop-up window and/or a another form of notification notifying the user that the desired program has resumed, allowing the user to switch back to the first channel without missing the desired program or ignore the notification by canceling the original designation of the first channel as the primary. If the user chooses to cancel the original designation and not switch back to the first channel, the original designation of the first channel as the primary channel is canceled and the back-ground tuners are made free to be assigned via their normal algorithm. When the user chooses to switch back to the first channel, in some embodiments the STB displays the desired program from a point in time right after the commercial break ends. For example if the STB is a DVR (digital video recorder), the STB could pause the TSB (time shift buffer) at the point where the commercial ended on behalf of the user. At this point the primary channel designation maybe cancelled by the user or may be left to remain until the program ends or could remain in perpetuity until the user presses cancel, e.g., on a "commercial complete" dialog box during a subsequent surf-away during commercial or until the user actively dismisses the desired designation through the menu.

Various embodiments have been discussed above. Specific exemplary embodiments will now be discussed in further detail but it should be appreciated that the invention is not intended to be limited by the exemplary embodiments which are to facilitate an understanding of the invention and its many possible applications.

In some embodiments a determination as to whether a commercial break has ended can be made in various manners.

Consider a first exemplary implementation, referred to as example 1. In example 1 a STB uses digital advertisement insertion tones/signals that exist in a content transport stream to detect the start and end of commercial breaks. The STB assumes or knows, e.g., from detecting a queue tone indicative of a commercial, that one of the tones has already passed when the user tunes away from a first channel over which the user receives a desired program, that is, a commercial is playing when the user tunes away. In this example, the STB counts tones and uses a timer to detect when, e.g., approximately 3 minutes worth of time including multiple tones have gone by. This is open loop, and the STB is guessing if the programming has resumed based on an expected duration of a commercial break including, e.g., an assumed 3 minutes worth of commercials. It should be appreciated that while traditional programming allows for predictable commercial timing, live sports events are not as predictable and the use of buffering to allow a user to skip back to view a portion of a program when a commercial break is over estimated in duration is particularly useful. In such embodiments the queue tones and estimate of the commercial break can be used to drive the commercial break countdown timer, commercial break end indicator and/or automatic switch back supported in some embodiments.

In another example, referred to as example 2, a STB monitors and/or waits for a programming resume signal, e.g., indicating the main program on the primary channel has resumed after detecting a commercial break before determining that a commercial break has ended. In this case, the content acquisition system at the headend inserts a proprietary or standardized ad insertion signal that specifically tells the STB when the main program will resume or that the main program has resumed following a commercial break. When the STB finds that signal indicating the end of a commercial break on the primary channel, it notifies the user and/or automatically switches back from a secondary channel to the primary channel. After such an automatic switch back the primary channel program content is output and displayed while the secondary program may continue to be received and recorded, e.g., buffered, in the event the user switches back to the secondary channel.

In yet a third example, a STB decodes and scans the content on the primary channel for a network logo watermark or other identifying characteristic of programming vs. commercials. For example, in some embodiments a network logo is incorporated into the image on the primary channel during all or portions the main program but not during commercials. In many such cases the logo is displayed when the main program is resumed following a commercial break allowing the logo to server as an indicator that the commercial break has ended. Once the STB detects, "sees", a network logo in the corner of the screen on the primary channel, the user is notified that programming has resumed and the end of the commercial break is considered as having been detected. Thus, the detection of a channel logo is used to trigger an end of commercial break to a user viewing a secondary channel and/or trigger an automatic switch back to outputting of the content of the primary program channel.

In a fourth exemplary embodiment referred to as example 4, the STB monitors to detect a next-segment signal on the primary channel after a switch to a secondary channel which is interpreted as an end of commercial break indicator in the fourth embodiment. In such an implementation, a programmer or content acquisition system in the headend that transmits the content on the primary program channel inserts a proprietary or standardized segment change signal that specifically indicates to the STB that a new segment in the program is beginning. In such embodiment, the switch back feature is not limited to commercial breaks and can be used to switch and/or notify the user of the end of a program segment with the system treating the end of program segment in the same manner as the end of a commercial break for switch back, buffering and/or user notification purposes. In such an embodiment if a user doesn't care to watch a particular segment of a desired program, not just commercials the methods and apparatus described herein can be used to allow the user to switch to a secondary program on a secondary channel during the program segment the user is not interested in without the risk of missing the next segment of the primary program. Once the STB receives a next-segment signal on the desired channel, the STB notifies the user that programming segment has ended, the program has resumed and/or automatically switches the output back to that of the primary channel and primary program that was being watched by the user prior to the user switching away to view the content on the secondary channel.

Some of the techniques used in some embodiments to determine if a commercial break is over include:

1) detecting an SCTE 35 "out" queue tone-standard, in a known MPEG data field which indicates where the commercial ends.

2) detecting an SCTE 35 "out" queue tone—obfuscated in MPEG private data field (to enhance security) with the queue tone indicating where the commercial ends.

3) using a proprietary OOB (out of band) signal, e.g., a signal sent over DAVIC/DOCSIS, synchronized with video stream and program data, providing information to the customer device, e.g., STB, regarding location, start, end and/or duration of commercial breaks.

The above examples are provided to facilitate understanding of some of the many various embodiments supported by the methods and apparatus of the invention and are not intended to be limiting in nature.

In various embodiments system elements described herein are implemented using one or more modules which are used to perform the steps corresponding to one or more methods of the present invention, for example, receiving content corresponding to a first program via a first channel, outputting to a display content corresponding to the first program, receiving user input indicating a change during a commercial break on the first channel to a second channel communicating a second program; providing a notification to a user indicating an end of the commercial break on the first channel during display of content received on said second channel; and automatically switching from the second channel back to the first channel in response to detecting the end of the commercial break on the first channel, etc.

In explaining the invention, exemplary embodiments have been described where the primary and secondary program channels are channels which are received via QAM (Quadrature Amplitude Modulated) channels which are tuned to, received, demodulated and when received in encoded format, decoded. In such embodiments a tuner circuit maybe, and normally is, coupled or combined with a demodulator circuit and a decoder circuit. While such QAM delivery embodiments are supported, it should be appreciated that the methods and apparatus of the present invention are not limited to QAM channel based content delivery methods.

In some embodiments the primary and secondary channels are both IP channels. The IP program channels may be implemented as broadcast, e.g., multicast channels or as unicast channels. In the case of unicast channels the primary and secondary program channels are implemented as two separate unicast content streams. As should be appreciated, the unicast content streams may be received in a variety of ways and an IP STB or other receiver device implemented in accordance with the invention may not, and in various embodiments does not, include QAM channel tuner and demodulator circuits. In embodiments using two unicast IP streams, e.g., as a primary program channel and a secondary program channel respectively, the IP streams may be received in a plurality of ways, e.g., on a single DOCSIS channel, on a bonded channel group, e.g., through a stand alone cable modem coupled to the set top box or receiver implementing the invention, or via other communications channels such as different satellite downlink channels in the case of a device which receives programs via a satellite receiver.

While the primary and secondary channels may be of the same type, e.g., program channels received over a QAM communications channel or channels, the primary and secondary program channels may correspond to different types of transport channels or networks. For example the primary program channel may be received via a QAM channel and the secondary program channel may be received via an IP based channel or network.

Thus it should be appreciated that when a program segment break is detected on a primary channel, in accordance with the invention a switch may be made to outputting content received on a secondary channel which may be of the same type or a different type than the primary channel, e.g., with both channels being QAM based channels, both channels being IP based channels or one of the channels being an IP based channel and the other a QAM based channel. Regardless of the channel type the end of the commercial break or other segment in the primary channel can be detected using anyone of the various methods described and the viewer notified and/or automatically switched back to the primary channel when the segment break, e.g., commercial break on the primary channel ends and the main program received on the primary channel resumes.

In the above described methods, in some embodiments, each step may be performed by one or more different software instructions executed by a computer processor, e.g., a central processing unit (CPU). At least one system implemented in accordance with the present invention includes a means for implementing each of the various steps which are part of the methods of the present invention. Each means may be, e.g., an instruction, processor, hardware circuit and/or combination of elements used to implement a described step.

Many of the above described methods or method steps can be implemented using machine, e.g., computer, executable instructions, such as software, included in a non-transitory machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. A set top box, comprising:
a processor configured to control the set top box to:
output, to a display, content corresponding to a first program being received via a first channel;
receive user input indicating a change, during a program segment on said first channel, to a second channel communicating a second program;
perform at least one of:
i) generating and providing a notification to a user indicating an end of the program segment on the first channel during display of content received on said second channel; or
ii) automatically switching from the second channel back to the first channel in response to detecting the end of the program segment on the first channel; and
a first buffer for storing some first program content, said stored first program content corresponding to said first program from an end of a commercial break on the first channel, said first program being content that is restricted from being recorded in its entirety; and
wherein said processor is further configured to control the set top box to output stored first program content corresponding to the first program beginning at the end of said commercial break following a switch from the second channel back to the first channel after the end of said commercial break.

2. The set top box of claim 1,
wherein said first buffer is a time shift buffer that is paused by the set top box at a point where a commercial ended on the first program channel.

3. The set top box of claim 2,
wherein said program segment is said commercial break including one or more commercials, the set top box further comprising:
an interface configured to:
receive and process the content corresponding to said first program during said commercial break; and receive and process content corresponding to said second program for display during said commercial break; and wherein said processor is further configured to control the set top box to output said content corresponding to said second program for display during said commercial break;

wherein said interface includes a first tuner tuned to said first channel for receiving content corresponding to said first program, said first tuner receiving said content corresponding to said first program during said commercial break; and wherein said processor is further configured to control the set top box to process the content corresponding to said first program to detect the end of the commercial break.

4. The set top box of claim 1, wherein said program segment is said commercial break including one or more commercials, the set top box further comprising:
an interface configured to continue to receive the content corresponding to the first program during the commercial break; and
wherein said processor is further configured to control the set top box to:
i) process the content corresponding to the first program received during the commercial break to detect the end of the commercial break without outputting the content on the display device; and
ii) automatically switch from the second channel back to the first channel in response to detecting the end of the commercial break on the first channel.

5. The set top box of claim 1, wherein said program segment is said commercial break, and wherein said processor controls the set top box to generate and provide a notification to a user indicating an end of the commercial break on the first channel during display of the content corresponding to said second program received on said second channel, said notification including a visual indication of the end of said commercial break presented on a portion of a display displaying said content corresponding to the second program.

6. The set top box of claim 5, wherein said processor is further configured to control the set top box to generate and provide a countdown timer showing a count down to the end of said commercial break, as part of generating and providing a notification to the user indicating an end of the commercial break on the first channel.

7. The set top box of claim 1, wherein said processor is further configured to control the set top box to:
record the second program; and
allow a user to continue viewing the second program form the point the second program was last viewed.

8. A method of operating a set top box, comprising:
outputting to a display content corresponding to a first program being received via a first channel;
receiving user input indicating a channel change request during a first program segment on said first channel to change to a second channel communicating a second program;
continuing to receive the content corresponding to the first program during the commercial break;
switching from outputting to the display the content corresponding to the first program to outputting to the display content corresponding to the second program;
storing some first program content, in a buffer, said stored first program content corresponding to said first program from an end of a commercial break on the first channel, said first program being content that is restricted from being recorded in its entirety;
performing at least one of:
i) providing a notification to a user indicating an end of the first program segment on the first channel during display of content received on said second channel; or
ii) automatically switching from the second channel back to the first channel in response to detecting the end of the first program segment on the first channel; and
outputting stored first program content beginning at the end of said commercial break following a switch from the second channel back to the first channel after the end of said commercial break.

9. The method of claim 8,
wherein storing content corresponding to the first program during the commercial break includes pausing a time shift buffer at a point where a commercial ended on the first program channel.

10. The method of claim 9, wherein the set top box is a digital video recorder; and
wherein the method further comprises: receiving and processing content corresponding to said first program during said commercial break, said receiving and processing content corresponding to said first program during said commercial break including:
receiving content corresponding to said first program via a first tuner tuned to said first channel;
processing the content corresponding to said first program to detect the end of the commercial break; and
using a time shift buffer to pause the first program at the point where the commercial break ended thereby allowing resumption of display of the first program from a point in time right after the commercial break ends.

11. The method of claim 8, wherein said first program segment is a commercial break, the method further comprising:
providing a notification to a user indicating an end of the commercial break on the first channel during display of the content corresponding to the second program, said notification being a visual indication of the end of said commercial break presented on a portion of a display displaying said content corresponding to the second program.

12. The method of claim 11, where providing a notification to a user includes:
generating a countdown timer showing a count down to the end of said commercial break.

13. The method of claim 12, further comprising:
monitoring, while the content corresponding to the second program is being output for display, for user input indicating a user command to switch to the first channel; and
switching to the first channel from the second channel in response to said monitoring detecting user input indicating a user command to switch to the first channel.

14. The method of claim 8, wherein said first program segment is a commercial break, the method further comprising:
detecting said commercial break on the first channel; and
determining when said commercial break on the first channel ends.

15. The method of claim 14, wherein detecting said commercial break includes:

determining a location and duration of the commercial break from commercial information communicated to said set top box over a data channel which is different from said first channel, said data channel being a DOCSIS channel.

16. The method of claim 14, wherein detecting said commercial break on the first channel includes detecting a queue tone used to indicate the start of a program break; and determining when said commercial break on the first channel ends includes detecting another queue tone indicating an end to the break.

17. The method of claim 14, wherein detecting said commercial break on the first channel includes receiving out of band signaling indicating the start and the end of the commercial break.

* * * * *